US008375445B2

(12) United States Patent
Higashikado

(10) Patent No.: US 8,375,445 B2
(45) Date of Patent: Feb. 12, 2013

(54) MALWARE DETECTING APPARATUS, MONITORING APPARATUS, MALWARE DETECTING PROGRAM, AND MALWARE DETECTING METHOD

(75) Inventor: Yoshiki Higashikado, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1143 days.

(21) Appl. No.: 12/258,915

(22) Filed: Oct. 27, 2008

(65) Prior Publication Data

US 2009/0113547 A1 Apr. 30, 2009

(30) Foreign Application Priority Data

Oct. 30, 2007 (JP) ................................ 2007-281904

(51) Int. Cl.
*G06F 11/00* (2006.01)

(52) U.S. Cl. ............. 726/23; 726/24; 370/233; 371/401

(58) Field of Classification Search ..................... 726/23
See application file for complete search history.

(56) References Cited

U.S. PATENT DOCUMENTS 7,457,965 B2 * 11/2008 Tamura et al. ................ 713/182
7,712,134 B1 * 5/2010 Nucci et al. ..................... 726/23
2005/0091533 A1 * 4/2005 Omote et al. ................. 713/201
2006/0291490 A1 * 12/2006 Omote et al. ................. 370/401
2007/0011745 A1 * 1/2007 Mitomo et al. ................. 726/24
2007/0094730 A1 * 4/2007 Bhikkaji et al. ................ 726/24
2009/0016221 A1 * 1/2009 Wakumoto .................... 370/233

FOREIGN PATENT DOCUMENTS

JP 2005-134974 5/2005
JP 2006-025096 1/2006
JP 2006-237892 9/2006
JP 2006-350561 12/2006
JP 2007-150613 6/2007

OTHER PUBLICATIONS

Daiji Ushiro; "Thorough Explanation of the "now" of the Latest Technology to Prevent Information Leaks!!" Lecture on Information Leak Countermeasures, the Essentials Made Understandable. Part 1; 13 pages; May 1, 2006.
Japanese Office Action for corresponding Japanese Application 2007-281904; dispatched Apr. 3, 2012.

* cited by examiner

*Primary Examiner* — Krista Zele
*Assistant Examiner* — James Forman
(74) *Attorney, Agent, or Firm* — Staas & Halsey LLP

(57) ABSTRACT

A malware detecting apparatus, monitoring apparatus, malware detecting program, and malware detecting method are provided. The method detects a plurality of nodes that have sent connection request information commonly to one of first destinations among a set of monitoring target nodes, detects, for each node in the set of monitoring target nodes, the number of second destinations to which the node has sent connection request information, identifies a node infected with malware based on the plurality of nodes detected and the number of second destinations detected, and outputs a result of the identification.

9 Claims, 11 Drawing Sheets

100

210

| PACKET NO. | SOURCE NODE | DESTINATION NODE |
|---|---|---|
| 1 | 162 | 160 |
| 2 | 163 | 160 |
| 3 | 164 | 160 |
| 3 | 166 | 162 |
| | | 163 |
| | | 164 |
| 4 | 164 | 163 |
| | | 162 |
| | | 166 |
| | | 165 |
| 5 | 162 | 166 |
| 6 | 163 | 160 |

121
COMMAND-AND-CONTROL DETECTING UNIT

| DETECTING CONDITION | DETECTED NODES |
|---|---|
| RECEIVED FROM THREE OR MORE NODES | 160 |

DETECT NODE A AS CANDIDATE OF COMMAND-AND-CONTROL SERVER

| DETECTING CONDITION | DETECTED NODES |
|---|---|
| SEND TO CANDIDATE OF COMMAND-AND-CONTROL SERVER | 162, 163, 164 |

DETECT NODES C, D, AND E AS FIRST CANDIDATES OF INFECTED NODES

122
INFECTION-ACTIVITY DETECTING UNIT

| DETECTING CONDITION | DETECTED NODES |
|---|---|
| SENT FROM THREE OR MORE NODES | 164, 166 |

DETECT NODES E AND G AS SECOND CANDIDATES OF INFECTED NODES

130
IDENTIFYING UNIT

| IDENTIFYING CONDITION | DETECTED NODES |
|---|---|
| INCLUDED IN BOTH FIRST AND SECOND CANDIDATES | 164 |

IDENTIFY NODE E AS INFECTED NODE 160
161
162
100
163
164
165
166

100
320
MEMORY
330
I/F
340
310
CPU 100
110
PACKET RECEIVING UNIT
120
DETECTING UNIT
121
COMMAND-AND-CONTROL DETECTING UNIT
122
INFECTION-ACTIVITY DETECTING UNIT
123
STORAGE UNIT
WHITE LIST
130
IDENTIFYING UNIT
140
OUTPUT UNIT 120
121
COMMAND-AND-CONTROL DETECTING UNIT
121a
TCP Syn, Src = SIP, Dst = DIP, Port = P
DURATION: XX
121b
DESTINATION IP ADDRESS
DESTINATION PORT
SOURCE IP ADDRESS
DURATION
10.25.10.1
6667
10.25.1.1
20
10.25.1.2
30
10.25.1.4
40
SOURCE IP ADDRESS
122
INFECTION-ACTIVITY DETECTING UNIT
122a
TCP Syn, Src = SIP, Dst = DIP, Port = P
122b
SOURCE IP ADDRESS
DESTINATION PORT
DESTINATION IP ADDRESS
NODE EXISTS
10.25.1.1
135
10.25.10.2
✓
10.25.10.3
–
10.25.20.4
✓
SOURCE IP ADDRESS 1000
1040
1030
1021
1022
1023
1024
1025
1026
1011
1012
1013
1014
1015
1016

1021
DATA SENDING PROGRAM
1101
122
INFECTION-ACTIVITY DETECTING UNIT
122b
SOURCE IP ADDRESS
DESTINATION IP ADDRESS
PORT
10.0.2.2
10.0.2.3
10.0.2.4
10.0.2.5
10.0.1.8
135
121
COMMAND-AND-CONTROL DETECTING UNIT
121b
10.0.2.4
10.0.1.5
10.0.1.8
6667
1026
10.0.3.2
10.0.3.4
10.0.3.3
10.0.3.5
10.0.4.8
21
1030
1040
DATA RECEIVING PROGRAM
1102
130
IDENTIFYING UNIT
131
FIRST CANDI-DATE
SECOND CANDI-DATE
INFECTED
140
OUTPUT UNIT

MALWARE DETECTING APPARATUS, MONITORING APPARATUS, MALWARE DETECTING PROGRAM, AND MALWARE DETECTING METHOD

CROSS-REFERENCE TO RELATED APPLICATIONS

This application is related to and claims priority to Japanese Patent Application No. 2007-281904, filed Oct. 30, 2007, in the Japanese Intellectual Property Office, and incorporated by reference herein.

BACKGROUND

1. Field

The embodiments discussed herein are directed to a malware detecting apparatus and method and a monitoring apparatus.

2. Description of the Related Art

Malware of a latent type that does not perform conspicuous infection activity on a network, such as a worm, is increasing. Since such malware acts in response to an infection activity instruction from a command-and-control server a personal computer (PC) often becomes latently infected with the malware without being noticed by an end user. Thus, such malware often serves for various types of unauthorized access, for example, as a base of a SPAM or DDOS (Distributed Denial of Service) attack.

Therefore, there exists a demand for techniques for discovering such latent-type malware at an early stage. Source programs of such malware are publicly available, for example, on the Internet, so that an attacker can obtain source code of malware relatively easily and create customized malware. Therefore, a large number of varieties of such malware exist.

For pattern matching by an anti-virus software installed on a PC, an anti-virus software vendor collects and analyzes samples of malware propagating in large scale and creates patterns for detecting the malware. However, since latent-type malware does not propagate in large scale, it takes a considerable time to collect samples, so that it is difficult to create patterns for detection.

Furthermore, since a large number of varieties arises for specific malware, it is difficult to detect the malware by anti-virus pattern patching. In view of this difficulty, conventionally malware detecting techniques detect malware-infected nodes based on behavior of malware on networks. Conventionally, the amount of communication of each node is monitored, and a node for which the amount of communication exceeds a threshold is identified as an infected node.

However, since the above-described related art is directed to detecting malware that causes increasing infection at a rapid rate, it is difficult to detect latent-type malware with slow infection activity as distinguished from normal communication. Therefore, in some cases, the related art fails to identify infected nodes, or incorrectly identifies non-infected nodes as infected nodes.

For example, with techniques that identify a node for which the amount of communication exceeds a threshold as an infected node, it is difficult to set a threshold for distinguishing communication associated with infection activity by malware and normal communication. Furthermore, it is not possible to detect malware if the amount of communication associated with infection activity by malware is substantially the same as the amount of normal communication.

SUMMARY

It is an aspect of the embodiments discussed herein to provide a malware detecting method that detects a plurality of nodes that have sent connection request information commonly to one of first destinations among a set of monitoring target nodes, detects, for each node in the set of monitoring target nodes, the number of second destinations to which the node has sent connection request information, identifies a node infected with malware based on the plurality of nodes detected and the number of second destinations detected, and outputs a result of the identification.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

Figure 1:
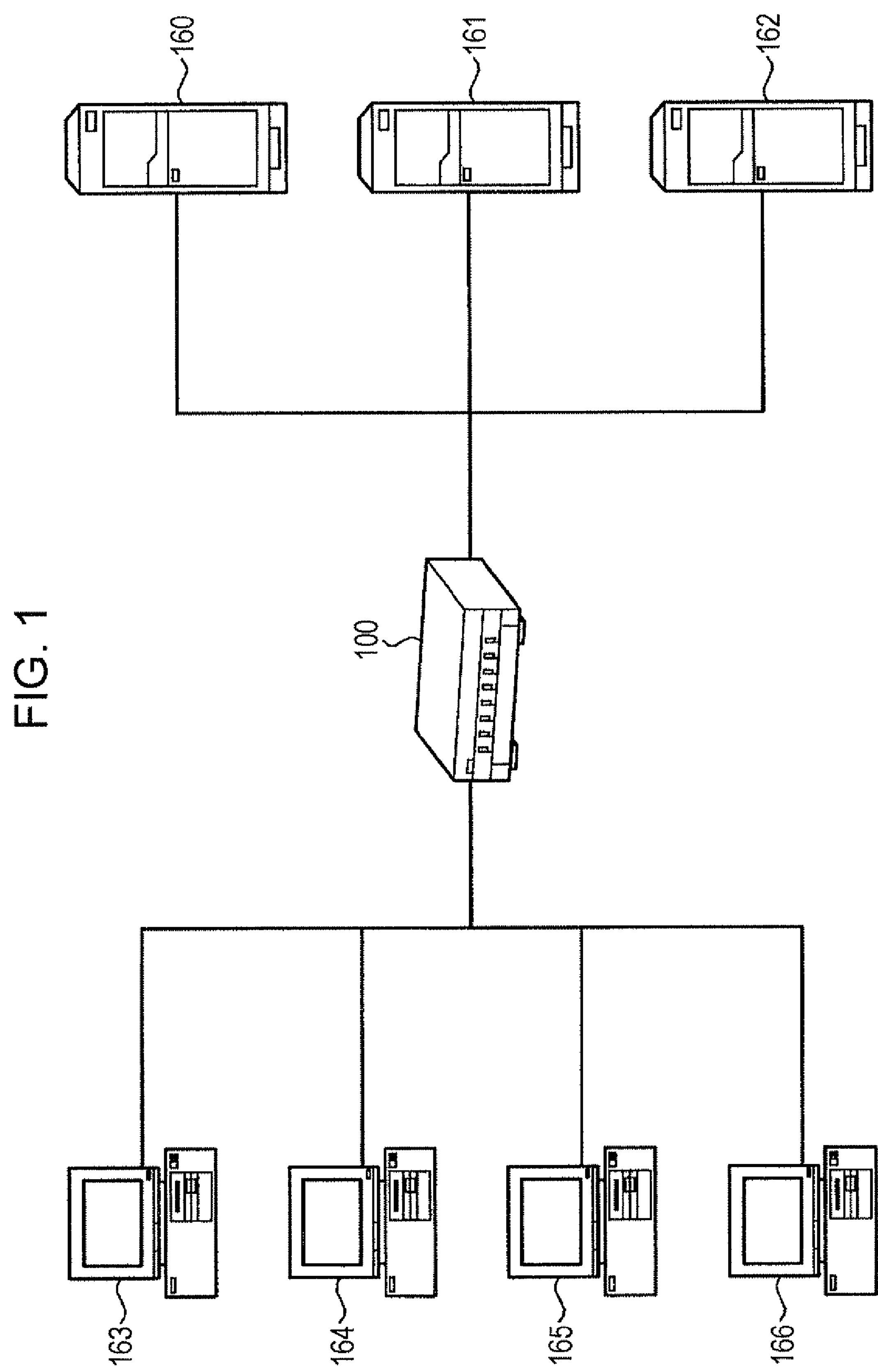
FIG. 1 illustrates a malware detecting apparatus according to an exemplary embodiment.

FIG. 1 illustrates the malware detecting apparatus according to an exemplary embodiment. As illustrated in FIG. 1, for example, a malware detecting apparatus 100 according to an exemplary embodiment is applied to a router of a network system in which a plurality of nodes 160 to 166 are connected.

The nodes 163 to 166 are a set of monitoring target nodes of the malware detecting apparatus 100. The malware detecting apparatus 100 performs routing of individual packets exchanged among the nodes 163 to G and individual packets exchanged between the nodes 163 to 166 and the nodes 160 to 162. Furthermore, the malware detecting apparatus 100 monitors the individual packets that are routed.

It is assumed here that the node 160 is a malware command-and-control server and the node 164 is a malware-infected node. The malware-infected node 164 sends connection request information to the node 160, which is the command-and-control server, and waits for an infection activity instruction from the node 160. Upon receiving an infection activity instruction from the node 160, the node 164 sends connection request information to a plurality of nodes among the nodes 161 to 163, 165, and 166 on the network system to perform infection activity.

Figure 2:
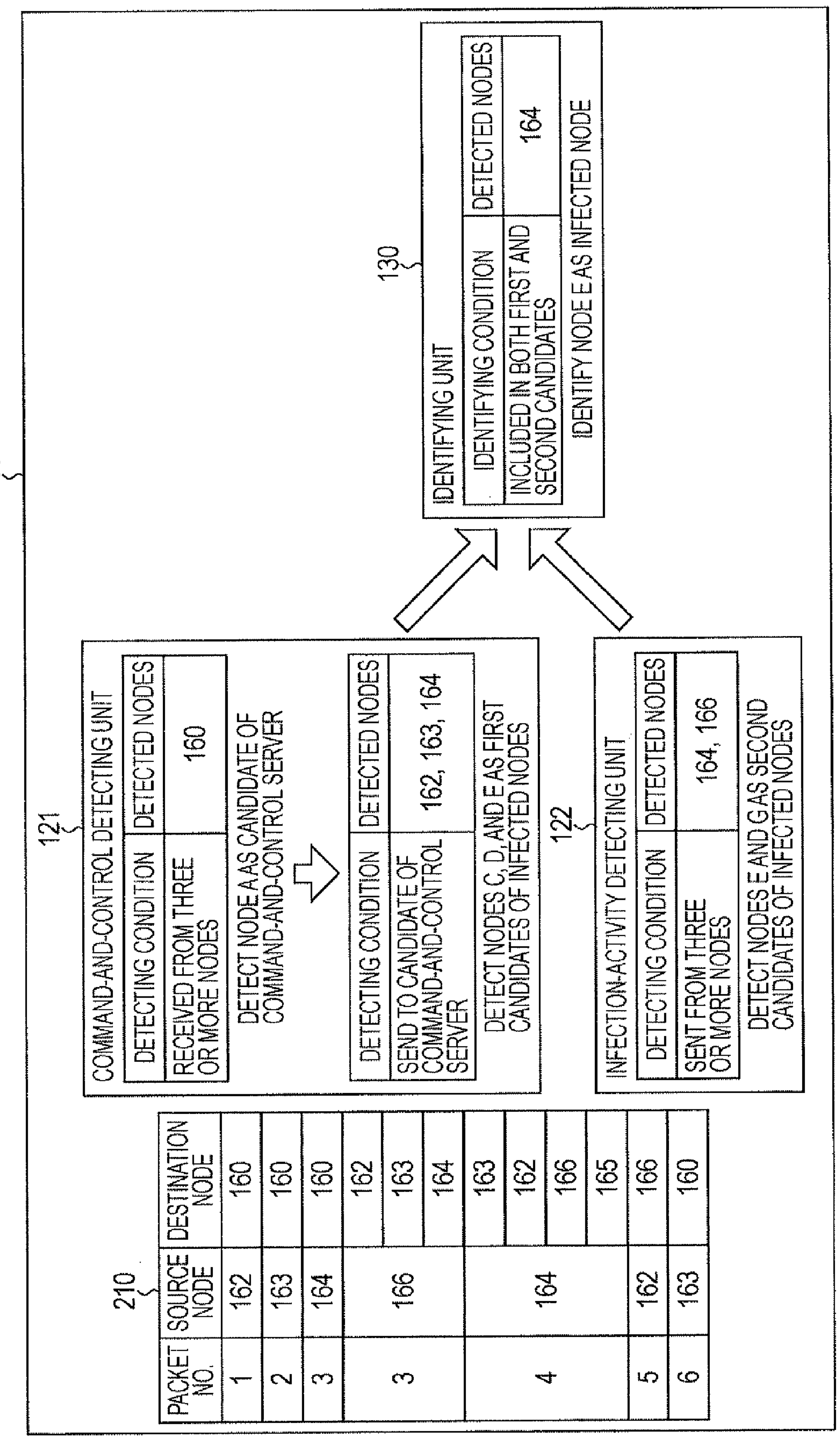
FIG. 2 illustrates the malware detecting apparatus according to an exemplary embodiment.

FIG. 2 illustrates the malware detecting apparatus according to an exemplary embodiment. A table 210 stores information representing source nodes and destination nodes of individual packets (connection request information) monitored by the malware detecting apparatus 100. Since a command-and-control server that causes malware infection sends infection activity instructions to a large number of infected nodes, a server with a large number of access nodes is presumed as having a high probability of being a command-and-control server issuing infection activity instructions.

Thus, a command-and-control detecting unit 121 of the malware detecting apparatus 100, based on the table 210, detects the node 160, having received packets from a number of nodes greater than or equal to a first threshold (the first threshold is 3 in this case), as a candidate of a malware command-and-control server. Furthermore, the command-and-control detecting unit 121 detects the nodes 162, 163, and 164, having sent packets to the node 160 detected as a candidate of a command-and-control server, as first candidates of infected nodes.

An infection-activity detecting unit 122 detects, based on the table 210, the nodes 164 and 166, having sent packets to a number of nodes greater than or equal to a second threshold (the second threshold is 3 in this case), as second candidates of infected nodes.

An identifying unit 130 identifies the node 164, which is included in both the first candidates of infected nodes (nodes 162, 163, and 164) detected by the command-and-control detecting unit 121 and the second candidates of infected nodes (nodes 164 and 166) detected by the infection-activity detecting unit 122 as a malware-infected node. As described above, the malware detecting apparatus 100 detects candidates of infected nodes by two detecting methods, and identifies a node detected by both of the two methods as an infected node.

When a malware-infected node performs infection activity, usually, the malware-infected node sends packets even to non-existing destinations. In contrast, when a node not infected with malware sends mails to a plurality of destinations, usually, all the destinations of packets exist. Therefore, the infection-activity detecting unit 122 may exclude, from the first candidates, nodes for which all the destinations of packets exist even if the nodes have sent packets to a number of nodes greater than or equal to the second threshold.

Furthermore, a white list representing a list of destinations that have been found as not being malware command-and-control servers may be provided. In this case, the command-and-control detecting unit 121 may exclude, from candidates of command-and-control servers, nodes included in the white list even if the nodes have received packets from a number of nodes greater than or equal to the first threshold.

Furthermore, a node infected with malware usually continues sending connection request information to the malware command-and-control server and waits for an infection activity instruction from the malware command-and-control server. Thus, the command-and-control detecting unit 121 may exclude, from the first candidates of infected nodes, nodes that have sent disconnection request information to candidates of command-and-control servers even if the nodes have sent connection request information to the candidates of command-and-control servers.

Figure 3:
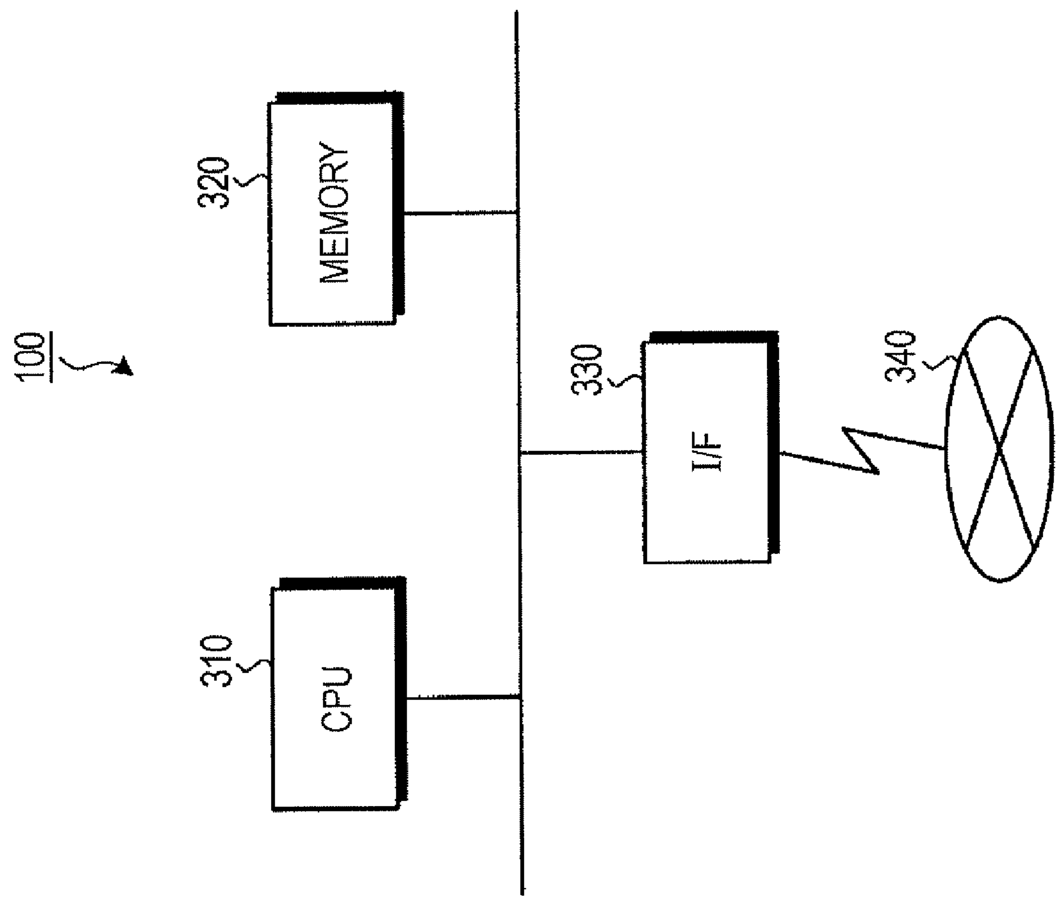
FIG. 3 illustrating a hardware configuration of the malware detecting apparatus according to an exemplary embodiment.

Next, the hardware configuration of the malware detecting apparatus 100 according to the first embodiment will be described. FIG. 3 illustrates a malware detecting apparatus according to an exemplary embodiment. As illustrated in FIG. 3, the malware detecting apparatus 100 includes a CPU 310, a memory 320, and an interface (I/F) 330.

The CPU 310 controls the malware detecting apparatus 100 as a whole. The memory 320 includes a read-only memory (ROM), a random access memory (RAM), a hard disk (HD), an optical disc, a flash memory, etc. The memory 320 may be used as a work area for the CPU 310.

Furthermore, the memory 320 stores various programs, which are loaded according to instructions from the CPU 310. The interface 330 sends packets to and receives packets from the nodes 160 to 166 (see FIG. 1) via a network 340. The interface 330 may be implemented by a network interface card (NIC) or the like.

Figure 4:
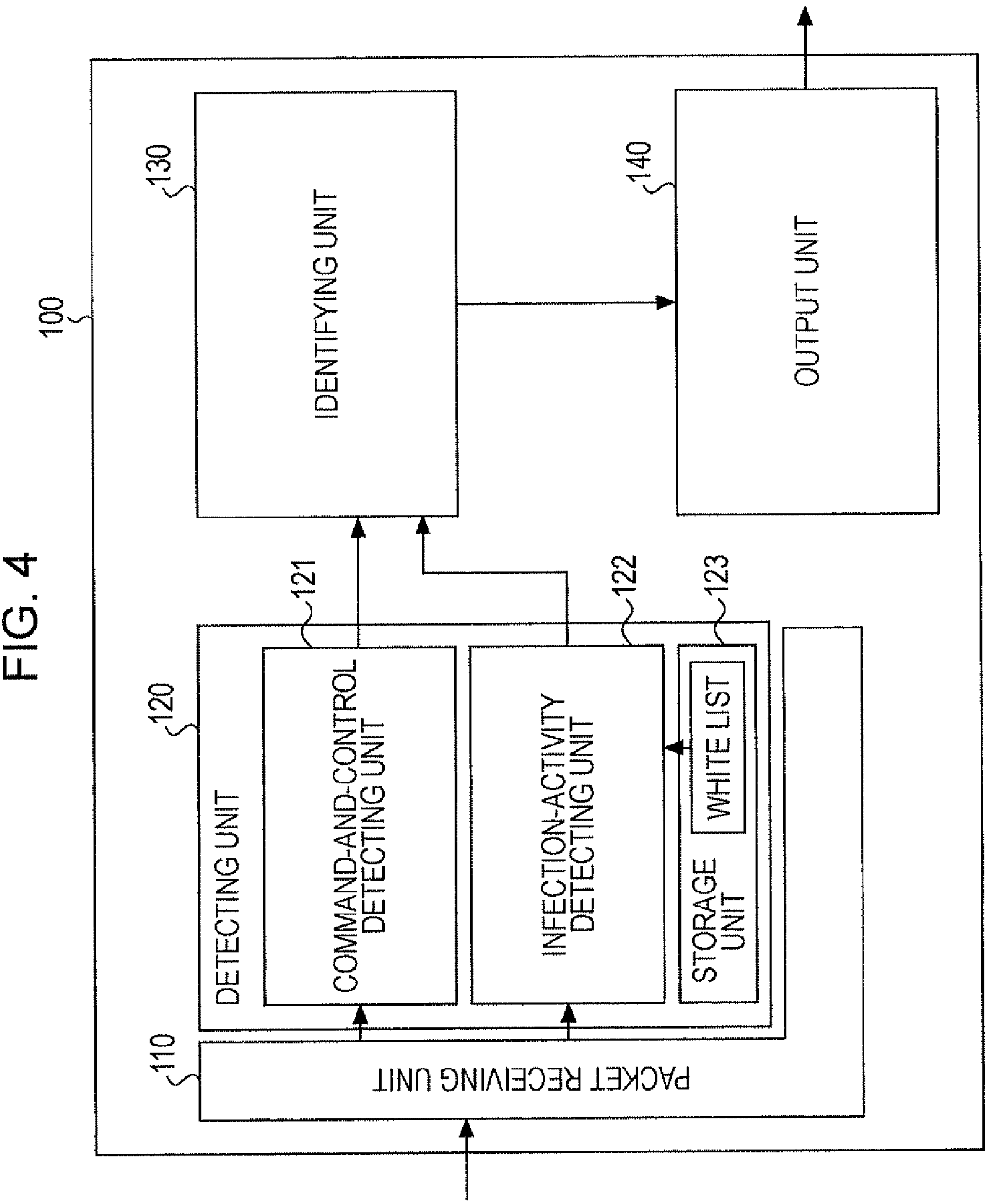
FIG. 4 illustrates a malware detecting apparatus.

FIG. 4 illustrates a functional configuration of the malware detecting apparatus. In FIG. 4, parts corresponding to those illustrated in FIG. 2 are designated by the same numerals. The malware detecting apparatus 100 includes a packet receiving unit 110, a detecting unit 120, an identifying unit 130, and an output unit 140.

The packet receiving unit 110 and the output unit 140 can be implemented by the interface 330. The detecting unit 120 and the identifying unit 130 can be implemented by causing the CPU 310 to execute programs relating to the detecting unit 120 and the identifying unit 130, stored in the memory 320 described above.

Furthermore, data output by functions of the packet receiving unit 110, the detecting unit 120, the identifying unit 130, and the output unit 140 is stored in the memory 320. As for the function of a destination of connection, indicated by an arrow in FIG. 4, data output from the function is read from the memory 320 and a program relating to the function is executed by the CPU 310.

The packet receiving unit 110 distributes and receives packets sent from or received by the monitoring target nodes. The packet receiving unit 110 outputs the received packets to the command-and-control detecting unit 121 and the infection-activity detecting unit 122. The detecting unit 120 includes the command-and-control detecting unit 121, the infection-activity detecting unit 122, and a storage unit 123.

Based on the packets output from the packet receiving unit 110, the command-and-control detecting unit 121 detects a plurality of nodes that have sent connection request information to a common first destination among the monitoring target nodes. The destination refers to a computer at a destination to which connection request information is sent, and a source refers to the computer that sends the connection request information. For example, the destination and source are identified based on their individual IP addresses or MAC addresses. Hereinafter, a common first destination to which a plurality of nodes among the monitoring target nodes has sent connection request information will be simply referred to as a "first destination".

Depending on the status of access of the monitoring target nodes, only one first destination exists in some cases, and a plurality of first destinations exist in other cases. For example, in a case where nodes a, b, c, d, e, and f among the monitoring target nodes send connection request information to and access a common server x, the server x is a first destination, and in a case where the nodes b, d, and e also send connection request information to and access a common server y, the server y is also a first destination.

Among the first destinations, the command-and-control detecting unit 121 detects, as a candidate of a malware command-and-control server, each destination for which the number of nodes that have sent connection request information thereto is greater than or equal to a first threshold. A destination for which the number of nodes that have sent connection request information thereto is greater than or equal to the first threshold refers to, for example, a destination corresponding to a node that have received connection request information from a number of nodes greater than or equal to the first threshold among the monitoring target nodes during a certain period.

In the case of the above example, the server x is accessed by the six nodes a, b, c, d, e, and f, and the server y is accessed by the three nodes b, d, and e. Assuming that the first threshold is 4, of the first destinations x and y, x is selected as a candidate of a malware command-and-control server.

The command-and-control detecting unit 121 detects, as first candidates of infected nodes, a plurality of nodes that have sent connection request information to the destination detected as a candidate of a command-and-control server. A first destination is a common destination to which packets monitored by the malware detecting apparatus 100 are sent, and the first destination may be a node (160 to 162 in FIG. 1) that is not monitored without limitation to the nodes (nodes 163 to 166 in FIG. 1) monitored by the malware detecting apparatus 100.

The storage unit 123 stores a white list. The white list is a list of destinations that are not command-and-control servers. As candidates of command-and-control servers, the command-and-control detecting unit 121 may detect, among the monitoring target nodes, first destinations that are not included in the white list stored in the storage unit 123. In this case, the command-and-control detecting unit 121 detects a plurality of nodes that have sent connection request information to a destination that is not included in the white list among the first destinations.

In the white list, destinations such as proxy servers, DNS servers, or Web servers that have been found as not being malware command-and-control servers are stored in advance. Thus, the command-and-control detecting unit 121 can detect nodes that are waiting for infection activity instructions from the command-and-control server as distinguished from nodes not infected with malware.

Furthermore, the command-and-control detecting unit 121 may detect, among the monitoring target nodes, a plurality of nodes that have not sent connection request information to any first destination. More specifically, among the plurality of nodes that have sent connection request information to destinations detected as candidates of command-and-control servers, the command-and-control detecting unit 121 excludes, from the first candidates of infected nodes, nodes that have also sent disconnection request information to the destinations detected as candidates of command-and-control servers.

The infection-activity detecting unit 122 detects the number of second destinations to which each node among the monitoring target nodes has sent connection request information. That is, for each node among the monitoring target nodes, the infection-activity detecting unit 122 detects the number of nodes to which the node has sent connection request information. Among the monitoring target nodes, the infection-activity detecting unit 122 detects, as a second candidate of an infected node, each node for which the number of destinations to which the node has sent connection request information is greater than or equal to a second threshold.

A node for which the number of destinations to which the node has sent connection request information is greater than or equal to the second threshold may be a node for which the number of destinations to which the node has sent connection request information during a certain period is greater than or equal to the second threshold, a node for which the number of destinations specified in connection request information sent by the node is greater than or equal to the second threshold, or a node satisfying at least one of these conditions.

Furthermore, the infection-activity detecting unit 122 may detect, among nodes for which the number of destinations to which the node has sent connection request information is greater than or equal to the second threshold, each node that has sent connection request information to a non-existing destination among the second destinations. For example, among nodes that have each sent connection request information to a number of destinations greater than or equal to the second threshold, the infection-activity detecting unit 122 detects each node for which at least one of the destinations to which the node has sent connection request information is non-existing.

The identifying unit 130 identifies a malware-infected node based on the plurality of nodes detected by the command-and-control detecting unit 121 and the number of destinations detected by the infection-activity detecting unit 122. More specifically, the identifying unit 130 identifies, as an infected node, each node detected both by the command-and-control detecting unit 121 and the infection-activity detecting unit 122.

By setting a relatively small value as the second threshold for the infection-activity detecting unit 122, it becomes possible to detect candidates of nodes infected with malware of a latent type that causes infection at a rather slow rate. In this case, although nodes not infected with malware could be possibly detected at the same time, since nodes not infected with malware are excluded through the detection performed by the command-and-control detecting unit 121, the possibility of a non-malware-infected node being identified by the identifying unit 130 can be reduced.

The identifying unit 130 outputs the identified destination to the output unit 140. The output unit 140 outputs alert information indicating that the destination output from the identifying unit 130 is a malware-infected node. The destinations to which the output unit 140 outputs the alert information are nodes that need malware infection information, such as individual nodes connected to the network or a management server of the network system. Alternatively, the output unit 140 may be a display, a speaker, or the like that notifies a user of alert information indicating that the destination output from the identifying unit 130 is a malware-infected node.

Figure 5:
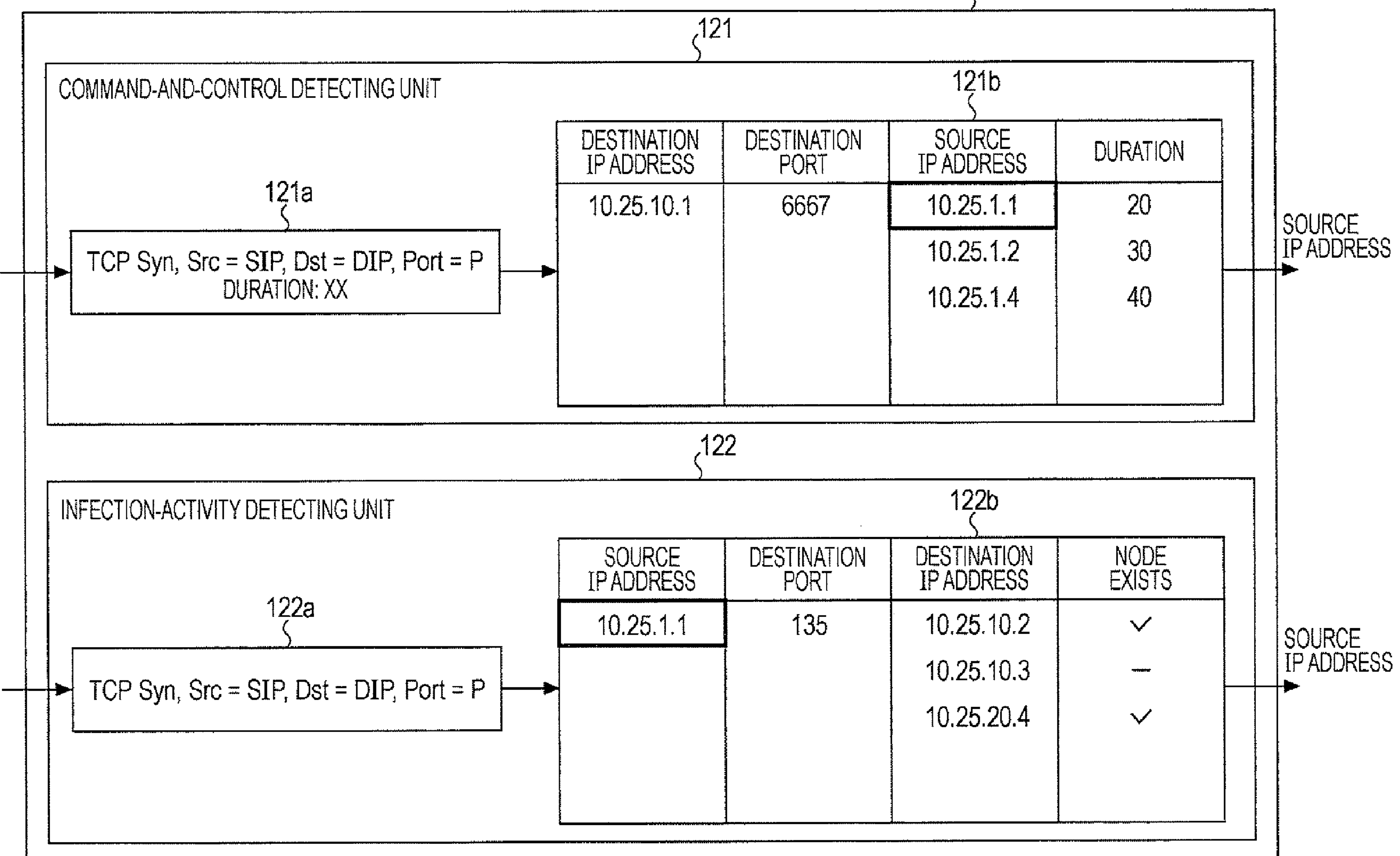
FIG. 5 illustrates detection of candidates of infected nodes by a detecting unit.

FIG. 5 illustrates exemplary detection of candidates of infected nodes by the detecting unit 120. As illustrated in FIG. 5, the command-and-control detecting unit 121 adds information of a packet 121*a* of connection request information output from the packet receiving unit 110 to a first table 121*b*. The infection-activity detecting unit 122 adds information of a packet 122*a* (which is the same packet as the packet 121*a*) of connection request information output from the packet receiving unit 110 to a second table 122*b*.

The packet 122*a* includes TCP (Transmission Control Protocol) Syn, which is information indicating that the packet represents a connection start request, Src (source address) indicating a source IP address, Dst (destination address) indicating a destination IP address, Port indicating a destination port, and a duration. The packet 122*a* includes information of TCP Syn, Src, Dst, and Port.

If the number of packets with the same destination IP address and different source IP addresses in the table 121*b* is greater than or equal to the first threshold, the command-and-control detecting unit 121 detects the source IP addresses of the individual packets. The command-and-control detecting unit 121 outputs the source IP addresses to the identifying unit 130 as first candidates of infected nodes.

It is assumed here that the first threshold is 3. Since three packets with different source IP addresses and sent to the same destination IP address "10.25.10.1" exist, the command-and-control detecting unit 121 detects the source IP addresses "10.25.1.1", "10.25.1.2", and "10.25.1.4" of the individual packets as first candidates of infected nodes.

At this time, since packets with short durations are not likely to be packets of connection request information sent from infected nodes, packets with durations less than or equal to a threshold may be excluded from the table 121*b*. Furthermore, even if connection request information has been sent from a source IP address to "10.25.10.1", if disconnection request information has also been sent from the source IP address to "10.25.10.1", the source IP address may be excluded from the table 121*b*.

The infection-activity detecting unit 122 detects, for each source IF address, the number of packets with the same source IP address and different destination IP addresses based on information of individual packets included in the second table 122*b*. Furthermore, the infection-activity detecting unit 122 detects each source IP address for which the number of destinations detected is greater than or equal to the second threshold as a second candidate of an infected node.

It is assumed here that the second threshold is 3. Since three packets sent from the same source IP address "10.25.1.1" to different IP addresses "10.25.10.2", "10.25.10.3", and "10.25.20.4" exist, the infection-activity detecting unit 122 detects the source IP address "10.25.1.1" of the packets as a second candidate of an infected node.

Furthermore, if all the nodes represented by the destination IP addresses of the individual packets sent to the source IP address exist, the infection-activity detecting unit 122 may exclude the source IP address from the second candidates of infected nodes. In this case, since the node corresponding to the destination IP address "10.25.10.3" of one of the three packets is non-existing, the infection-activity detecting unit 122 detects the source IP address "10.25.1.1" of the three packets as a second candidate of an infected node.

Although a case has been described where a source IP address is excluded from the second candidates of infected nodes if all the nodes represented by the destination IP addresses of individual packets sent to the source IP address exist, a source IP address may be excluded from the second candidates of infected nodes if a number of nodes greater than or equal to a threshold among the nodes represented by the individual destination IP addresses exist, without limitation to the case where all the nodes represented by the individual destination IP addresses exist.

Figure 6:
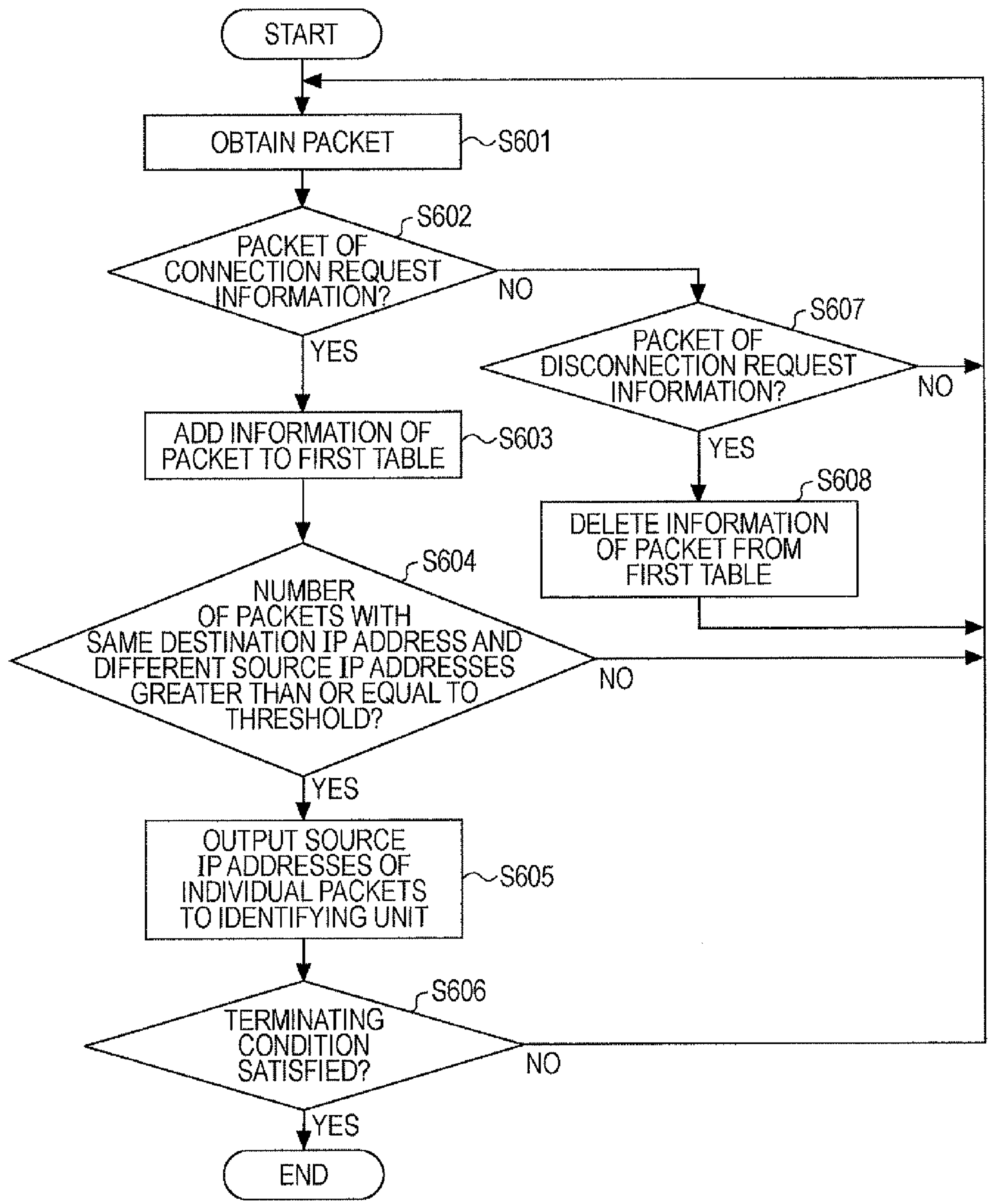
FIG. 6 illustrates exemplary operation of a command-and-control detecting unit.

FIG. 6 illustrates exemplary operation of the command-and-control detecting unit 121. First, the command-and-control detecting unit 121 obtains a packet output from the packet receiving unit 110 (operation S601), and determines whether the packet obtained is a packet of connection request information (operation S602). If the packet is a packet of connection request information (Yes in operation S602), the information of the packet is added to the first table 121*b* (operation S603).

Then, based on the first table 121*b*, the command-and-control detecting unit 121 determines whether the number of packets with the same destination IP address and different source IP addresses is greater than or equal to a threshold (operation S604). If the number of packets with the same destination IP address and different source IP addresses is greater than or equal to the threshold (Yes in operation S604), the command-and-control detecting unit 121 outputs the individual source IP addresses of the packets to the identifying unit 130 as first candidates of infected nodes (operation S605).

Then, the command-and-control detecting unit 121 determines whether a condition for terminating its operation is satisfied (operation S606). If the terminating condition is satisfied (Yes in operation S606), the command-and-control detecting unit 121 quits the series of operation.

Upon determining in operation S602 that the packet obtained in operation S601 is not a packet of connection request information (No in operation S602), the command-and-control detecting unit 121 determines whether the packet is a packet of disconnection request information (operation S607). If the packet obtained in operation S601 is a packet of disconnection request information (Yes in operation S607), the command-and-control detecting unit 121 deletes information of the packet from the first table 121*b* (operation S608). Then, the command-and-control detecting unit 121 returns to operation S601 and continues the process.

Upon determining in operation S604 that the number of packets with the same destination IP address and different source IP addresses is not greater than or equal to the threshold (No in operation S604), upon determining in operation S606 that the terminating condition is not satisfied (No in operation S606), or upon determining in operation S607 that the packet is not a packet of disconnection request information (No in operation S607), the command-and-control detecting unit 121 returns to operation S601 and continues the process. Through the above-described operation of the command-and-control detecting unit 121, a plurality of source IP addresses are output to the identifying unit 130 as first candidates of infected nodes.

In the operation described above, the command-and-control detecting unit 121 performs detection of first candidates of infected nodes (operation S604) each time upon obtaining a packet of connection request information. Alternatively, the command-and-control detecting unit 121 may perform detection of candidates of infected nodes (operation S604) each time upon accumulation of a predetermined number of packets or at regular intervals while accumulating packets obtained in the first table 121*b*.

Figure 7:
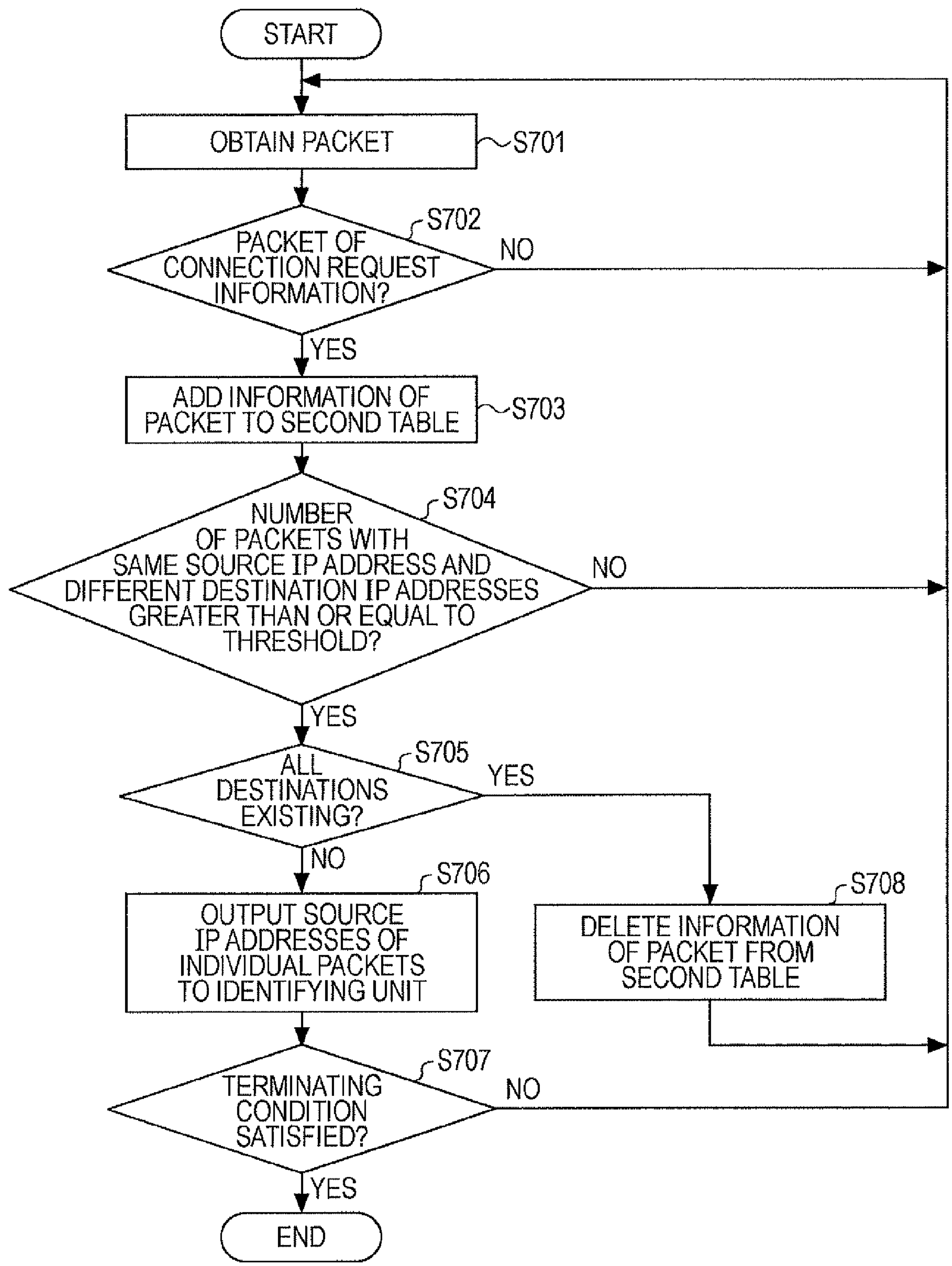
FIG. 7 illustrates exemplary operation of an infection-activity detecting unit.

FIG. 7 illustrates exemplary operation of the infection-activity detecting unit 122. First, the infection-activity detecting unit 122 obtains a packet output from the packet receiving unit 110 (operation S701), and determines whether the packet obtained is a packet of connection request information (Operation S702). If the packet obtained is a packet of connection request information (Yes in operation S702), the infection-activity detecting unit 122 adds information of the packet to the second table 122*b* (operation S703).

Then, based on the second table 122*b*, the infection-activity detecting unit 122 determines whether the number of packets with the same source IP address and different destination IP addresses is greater than or equal to a threshold (operation S704). If the number of packets with the same source IP address and different destination IP addresses is greater than or equal to the threshold (Yes in operation S704), the infection-activity detecting unit 122 determines whether all the destinations represented by the individual IP addresses of the packets exist (operation S705).

If one or more of the destinations do not exist in operation S705 (No in operation S705), the infection-activity detecting unit 122 outputs the source IP addresses of the packets to the identifying unit 130 as second candidates of infected nodes (operation S706). Then, the infection-activity detecting unit 122 determines whether a condition for terminating its operation is satisfied (operation S707). If the terminating condition is satisfied (Yes in operation S707), the infection-activity detecting unit 122 quits the series of operation.

Upon determining in operation S705 that all the destinations exist (Yes in operation S705), the infection-activity detecting unit 122 deletes information of the packets from the second table 122_b_ (operation S708). Then, the infection-activity detecting unit 122 returns to operation S701 and continues the process.

Upon determining in operation S702 that the packet is not a packet of connection request information (No in operation S702), Upon determining in operation S704 the number of packets with the same source IP address and different destination IP addresses is not greater than or equal to the threshold (No in operation S704), or if the terminating condition is not satisfied in operation S707 (No in operation S707), the process returns to operation 701 and continues the process. Through the above-described operation of the infection-activity detecting unit 122, one or more source IP addresses are output to the identifying unit 130 as second candidates of infected nodes.

In the operation described above, the infection-activity detecting unit 122 performs detection of second candidates of infected nodes (operation S704) each time upon obtaining a packet of connection request information. Alternatively, the infection-activity detecting unit 122 may perform detection of second candidates of infected nodes (operation S704) each time upon accumulation of a predetermined number of packets or at regular intervals while accumulating packets obtained in the second table 122_b_.

Figure 8:
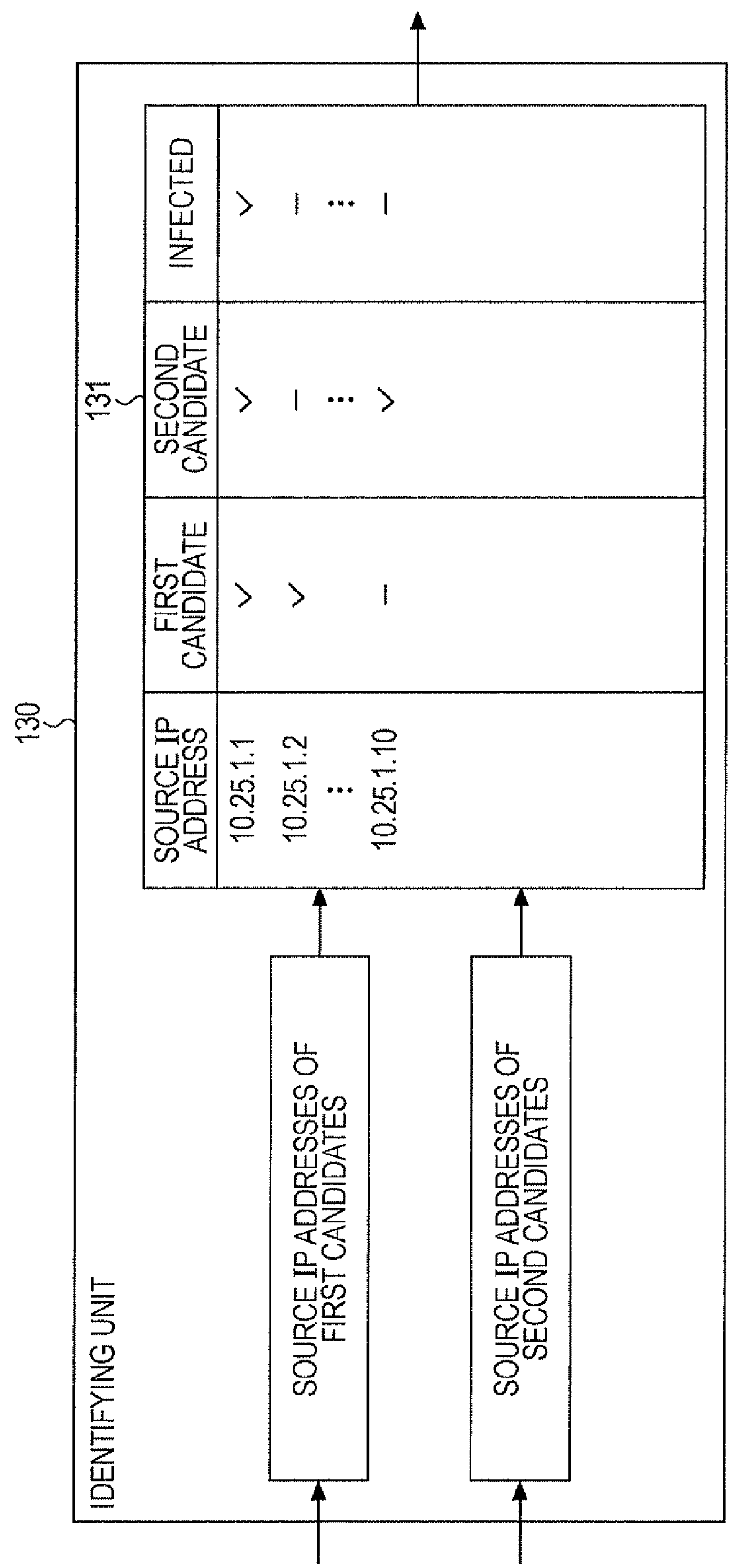
FIG. 8 illustrates exemplary identification of infected nodes by an identifying unit.

FIG. 8 illustrates an exemplary identification of infected nodes by the identifying unit 130. As illustrated in FIG. 8, the identifying unit 130 adds source IP addresses output from the command-and-control detecting unit 121 to a third table 131 as first candidates of infected nodes. Furthermore, the identifying unit 130 adds source IP addresses output from the infection-activity detecting unit 122 to the third table 131 as second candidates of infected nodes.

The identifying unit 130 identifies each source IP address added both as a first candidate and as a second candidate in the third table 131 as a malware-infected node. In this example, since a source IP address "10.25.1.1" is included both as a first candidate and as a second candidate, the identifying unit 130 identifies the source IP address "10.25.1.1" as a malware-infected node.

Figure 9:
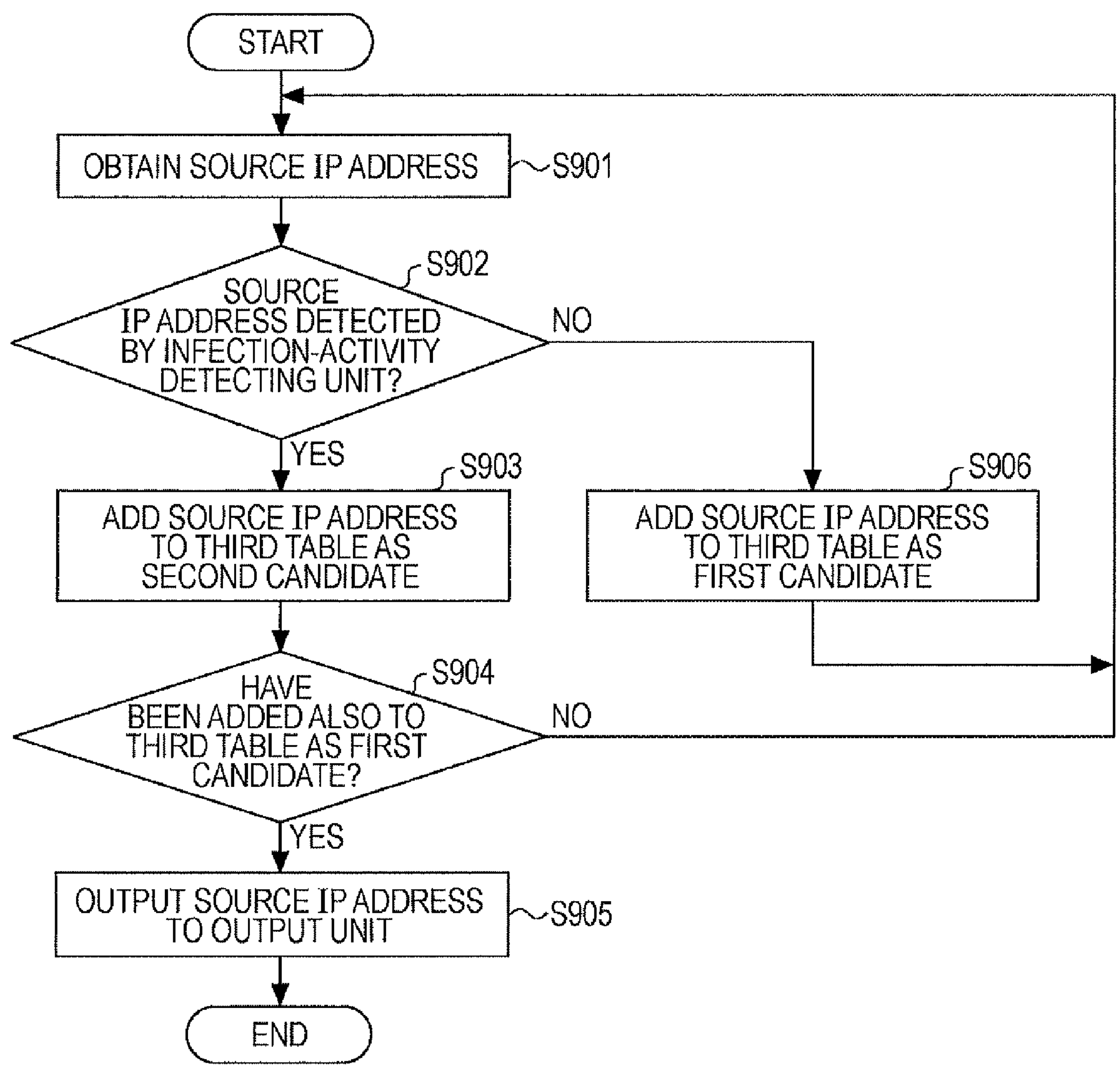
FIG. 9 illustrates exemplary operation of the identifying unit.

FIG. 9 illustrates an exemplary operation of the identifying unit 130. First, the identifying unit 130 obtains a source IP address output from the command-and-control detecting unit 121 or the infection-activity detecting unit 122 (operation S901). Then, the identifying unit 130 determines whether the source IP address obtained in operation S901 is a source IP address detected by the infection-activity detecting unit 122 (operation S902).

Upon determining in operation S902 that the source IP address obtained is a source IP address detected by the infection-activity detecting unit 122 (Yes in operation S902), the identifying unit 130 adds the source IP address to the third table 131 as a second candidate of an infected node (operation S903).

Then, the identifying unit 130 determines whether the source IP address added to the third table 131 in operation S903 has also been added to the third table 131 as a second candidate (operation S904). If the source IP address has also been added to the third table 131 as a first candidate (Yes in operation S904), the identifying unit 130 outputs the source IP address added to the third table 131 in operation S903 to the output unit 140 as information of an infected node (operation S905).

Upon determining in operation S902 that the source IP address is a source IP address detected by the command-and-control detecting unit 121 (No in operation S902), the identifying unit 130 adds the source IP address to the third table 131 as a first candidate of an infected node (operation S906). Then, the identifying unit 130 returns to operation S901 and continues the process.

Upon determining in operation S904 that the source IP address has not been added as a first candidate in the third table 131 (No in operation S904), the identifying unit 130 returns to operation S901 and continues the process. Through the above-described operation of the identifying unit 130, a malware-infected node is identified, and a source IP address representing the malware-infected node is output to the output unit 140.

The infected node sends connection request information to a command-and-control server and waits for an infection activity instruction. Upon receiving an infection activity instruction from the command-and-control server, the infected node performs an infection activity to cause infection of other nodes. Thus, upon occurrence of a series of infection activity, first, the command-and-control detecting unit 121 detects a first candidate of an infected node, and then the infection-activity detecting unit 122 detects a second candidate of an infected node.

Therefore, when a series of infection activity has occurred, upon obtainment of a source IP address detected by the infection-activity detecting unit 122, it is highly probable that the identifying unit 130 has already obtained a source IP address detected by the command-and-control detecting unit 121. Thus, by performing identification of an infected node (operation S904) upon obtaining the source IP address detected by the infection-activity detecting unit 122, the identifying unit 130 can identify an infected node efficiently.

As described above, with the malware detecting apparatus 100 according to an exemplary embodiment, by identifying a node included in both first candidates of infected nodes detected by the command-and-control detecting unit 121 and second candidates of infected nodes detected by the infection-activity detecting unit 122, it is possible to identify a node satisfying both of the two types of characteristics of a node infected with latent-type malware. Therefore, it is possible to accurately identify nodes infected with latent-type malware.

Furthermore, by adjusting the values of the first and second thresholds, it is possible to accurately detect nodes infected with latent type malware with slow infection activity, while excluding normal nodes not infected with malware.

Furthermore, by the infection-activity detecting unit 122 detecting each node that has sent connection request information to a non-existing destination among second destinations among nodes for which the number of second destinations is greater than or equal to the second threshold, in a case where a node not infected with malware performs communication with a plurality of destinations, it is possible to reduce the probability of detecting this node as a second candidate of an infected node. Therefore, it is possible to accurately detect nodes infected with latent-type malware.

Furthermore, by the command-and-control detecting unit 121 detecting a plurality of nodes that have not sent disconnection request information to any first destination among the monitoring target nodes, it is possible to reduce the probability of detecting a node not infected with malware as a first candidate of an infected node. Therefore, it is possible to accurately detect nodes infected with latent-type malware.

In the configuration of an exemplary embodiment described above, malware-infected nodes are detected by the malware detecting apparatus 100, which is applied to, for example, a router of a network system. In another exemplary embodiment, a part corresponding to the detecting unit 120 of the malware detecting apparatus 100 according to the first exemplary embodiment is provided in an edge router, which is provided in association with each segment of a network system.

Furthermore, parts corresponding to the identifying unit 130 and the output unit 140 of the malware detecting apparatus 100 according to the first exemplary embodiment may be provided in a central management server capable of performing communication with each edge router of the network system. Thus, the central management server can identify infected nodes based on first candidates and second candidates of infected nodes, detected by the edge routers of the individual segments.

Accordingly, it is possible to identify infected nodes based on combination of the results of detection of the individual segments. Therefore, even in a case where a node in a certain segment is a command-and-control server of malware and a node in another segment is infected with the malware, it is possible to accurately identify the node infected with the malware.

Figure 10:
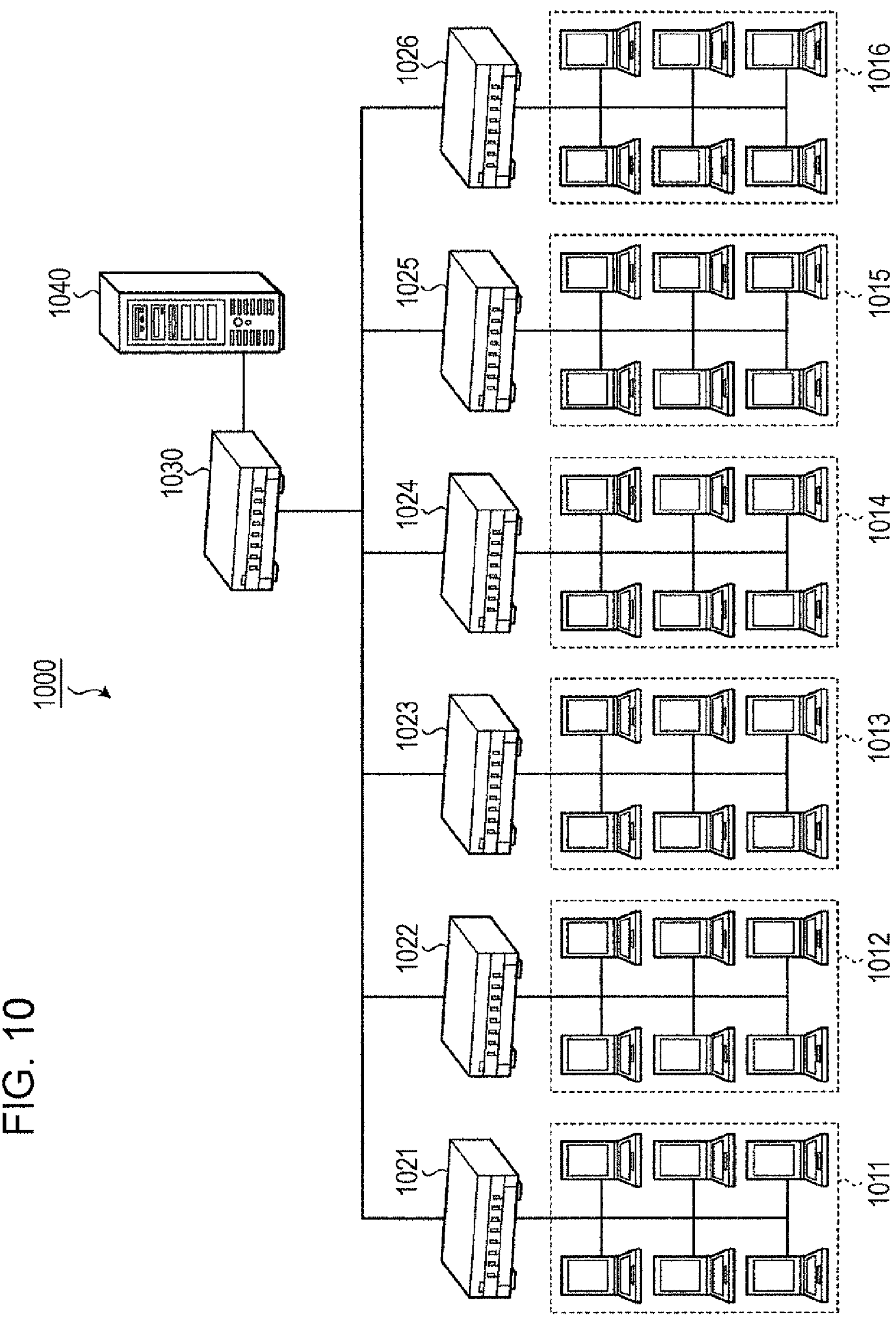
FIG. 10 illustrates a network system according to an exemplary embodiment.

FIG. 10 illustrates a network system according to the second embodiment. A network system 1000 includes a plurality of segments 1011 to 1016, a plurality of edge routers 1021 to 1026, a router 1030, and a central management sever 1040 that manages exchange of packets in the network system 1000. The segment 1011 includes six nodes The edge router 1021 is provided in association with the segment 1011. The edge router 1021 is a monitoring apparatus capable of performing communication with the central management server 1040. The edge router 1021 performs routing of packets exchanged by a set of monitoring target nodes, i.e., the nodes of the segment 1011, and monitors the packets. The edge routers 1022 to 1026 are provided in association with the segments 1012 to 1016, respectively.

The router 1030 performs routing of packets exchanged among the plurality of edge routers 1021 to 1026. The central management server 1040 is a malware detecting apparatus capable of performing communication with the edge routers 1021 to 1026 via the router 1030. The central management server 1040 identifies malware-infected nodes among the nodes in the segments 1011 to 1016.

Figure 11:
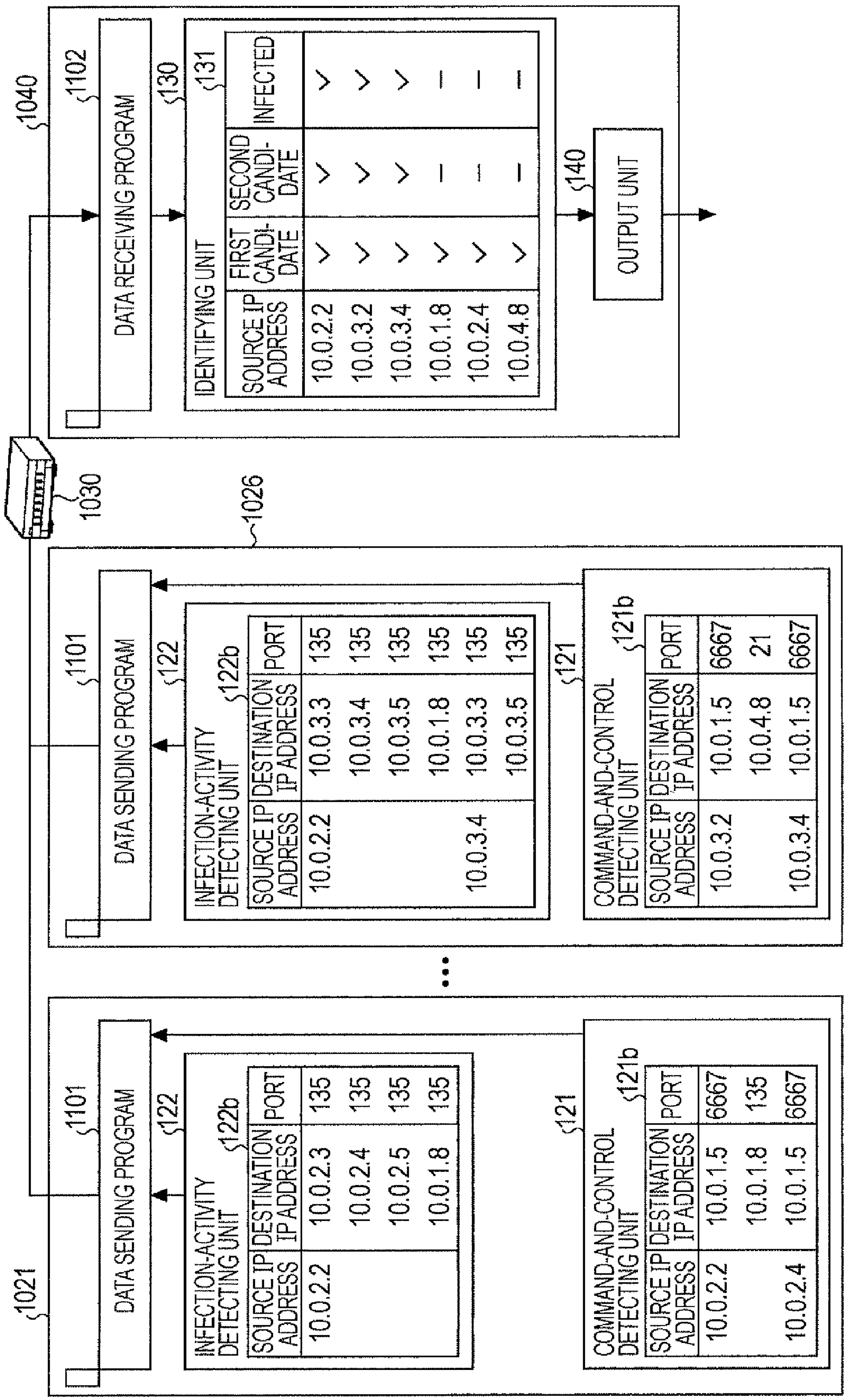
FIG. 11 illustrates exemplary detection of infected nodes by a central management server.

FIG. 11 illustrates exemplary detection of infected nodes by the central management server 1040. In FIG. 11, parts corresponding to those illustrated in FIG. 4 are designated by the same numerals, and descriptions thereof will be omitted. The edge router 1021 includes a packet receiving unit 110 (not shown), a command-and-control detecting unit 121, an infection-activity detecting unit 122, and a data sending program 1101.

It is assumed in the following description that the first threshold and the second threshold are 2. The packet receiving unit 110 of the edge router 1021 distributes and receives packets sent or received by the individual nodes included in the segment 1011. The packet receiving unit 110 outputs the received packets to the command-and-control detecting unit 121 and the infection-activity detecting unit 122.

The operation of the command-and-control detecting unit 121 of the detecting unit 120 of the edge router 1021 is substantially the same as the operation shown in FIG. 6. More specifically, in operation S605 shown in FIG. 6, the command-and-control detecting unit 121 of the detecting unit 120 of the edge router 121 sends the source IP addresses of packets detected as first candidates of infected nodes to the central management server 1040 via the data sending program 1101. The operation is otherwise the same as the corresponding operations shown in FIG. 6, so that description thereof will be omitted.

The operation of the infection-activity detecting unit 122 of the detecting unit 120 of the edge router 1021 is substantially the same as the operation shown in FIG. 7. More specifically, in operation S706 shown in FIG. 7, the infection-activity detecting unit 122 of the detecting unit 120 of the edge router 1021 sends the source IP addresses of packets detected as second candidates of infected nodes to the central management server 1040 via the data sending program 1101. The operation is otherwise the same as the corresponding operations shown in FIG. 7, so that description thereof will be omitted. The configuration and operation of each of the edge routers 1022 to 1026 is the same as those of the edge router 1021, so that description thereof will be omitted.

In this case, since information of two packets sent to a common first destination “10.0.1.5” exists in the first table 121*b*, the command-and-control detecting unit 121 of the edge router 1021 sends to the central management server 1040 the source IP addresses “10.0.2.2” and “10.0.2.4” of the packets as first candidates of infected nodes.

Furthermore, since information of four packets sent from the same source IP address “10.0.2.2” to different destinations exists in the second table 122*b*, the infection-activity detecting unit 122 of the edge router 1021 sends the source IP address “10.0.2.2” as a second candidate of an infected node to the central management server 1040.

Since information of two packets sent to a common first destination “10.0.1.5” exists in the first table 121*b*, the command-and-control detecting unit 121 of the edge router 1026 sends to the central management server 1040 the source IP addresses “10.0.3.2” and “10.0.3.4” of the packets as first candidates of infected nodes.

Furthermore, since information of four packets sent from the same source IP address “10.0.2.2” to different destinations exists in the second table 122*b*, the infection-activity detecting unit 122 of the edge router 1026 sends the source IP address “10.0.2.2” as a second candidate of an infected node to the central management server 1040.

Furthermore, since information of two packets sent from the same source IP address “10.0.3.4” to different destinations exists in the second table 122*b*, the infection-activity detecting unit 122 of the edge router 1026 sends the source IP address “10.0.3.4” as a second candidate of an infected node to the central management server 1040.

The central management server 1040 includes a data receiving program 1102, an identifying unit 130, and an output unit 140. The data receiving program 1102 receives source IP addresses of first candidates of infected nodes, sent from the command-and-control detecting units 121 of the edge routers 1021 to 1026, and receives source IP addresses of second candidates of infected nodes, sent from the infection-activity detecting units 122 of the edge routers 1021 to 1026.

The identifying unit 130 obtains the source IP addresses sent from the edge routers 1021 to 1026 via the data receiving program 1102. The operation of the identifying unit 130 of the central management server 1040 is substantially the same as the operation shown in FIG. 9. More specifically, in operation S901 shown in FIG. 9, the identifying unit 130 of the central management server 1040 obtains source IP addresses sent from the edge routers 1021 to 1026 via the data receiving program 1102.

In operation S902, without distinction as to which of the edge routers 1021 to 1026 the source IP addresses have been sent from, the identifying unit 130 of the central management server 1040 determines whether each of the source IP addresses is a source IP address detected by the infection-activity detecting unit 122. The operation is otherwise the same as the corresponding operations shown in FIG. 9, so that description thereof will be omitted.

In this case, since source IP addresses "10.0.2.2", "10.0.3.2", and "10.0.3.4" are included both as first candidates and second candidates in the third table 131, the identifying unit 130 of the central management server 1040 identifies these source IP addresses as malware-infected nodes.

As described above, with the network system 1000 according to the second embodiment, in addition to the advantage of the malware detecting apparatus 100 according to an exemplary embodiment, the central management server 1040 can detect infected nodes based on first candidates and second candidates of infected nodes individually detected by the edge routers 1021 to 1026 associated with the individual segments Therefore, it is possible to identify infected nodes based on combination of the results of detection of the individual segments 1011 to 1016.

According to the embodiments described above, it is possible to accurately identify nodes infected with latent-type malware.

The malware detecting methods according to the exemplary embodiments may be implemented by executing a program prepared in advance by a computer such as a personal computer or a workstation. The program can be recorded on a computer-readable recording medium, such as a hard disk, a flexible disk, a CD-ROM, an MO, or a DVD, and can be read from the recording medium and executed by the computer. Alternatively, the program may be distributed via a network, such as the Internet.

The malware detecting apparatus 100 according to an exemplary embodiment can also be implemented in the form of an application specific integrated circuit (ASIC), such as a standard cell or structured ASIC, or a programmable logic device (PLD), such as an FPGA. More specifically, for example, the malware detecting apparatus 100 can be manufactured by defining the functions of the malware detecting apparatus 100 (110, 120, 130, and 140) by HDL description, and providing an ASIC or PLD with a result of logical synthesis of the HDL description.

As described above, the apparatuses, programs, and methods are effective for identification of nodes infected with malware, and particularly suitable for identification of nodes infected with latent-type malware.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A malware detecting apparatus comprising:

a processor comprising :

a first detecting unit capable of detecting a plurality of nodes that have sent connection request information commonly to one of first destinations among a set of monitoring target nodes, the first detecting unit detecting, among the set of monitoring target nodes, a plurality of nodes that have not sent disconnection request information to the one first destination, the first detecting unit excluding as an infected node, nodes that have sent disconnection request information to the one first destination;

a second detecting unit capable of detecting, for each node in the set of monitoring target nodes, the number of second destinations to which the node has sent connection request information;

an identifying unit capable of identifying a node infected with malware based on the plurality of nodes detected by the first detecting unit and the number of second destinations detected by the second detecting unit; and an output unit capable of outputting a result of the identification by the identifying unit.

2. The malware detecting apparatus according to claim 1, wherein the first detecting unit detects, for each first destination for which the number of nodes that have sent connection request information thereto is greater than or equal to a first threshold among the first destinations, a plurality of nodes that have sent connection request information to the first destination, wherein the second detecting unit detects each node for which the number of second destinations is greater than or equal to a second threshold among the set of monitoring target nodes, and wherein the identifying unit identifies each node detected by both the first detecting unit and the second detecting unit as a node infected with the malware.

3. The malware detecting apparatus according to claim 2, wherein the second detecting unit detects, among nodes for which the number of second destinations is greater than or equal to the second threshold, each node that has sent connection request information to a non-existing destination among the second destinations.

4. The malware detecting apparatus according to claim 1, further comprising storage for storing a destination not corresponding to a command-and-control server of the malware, wherein the first detecting unit detects, among the set of monitoring target nodes, a plurality of nodes that have sent connection request information to a destination not stored in the storage.

5. A monitoring apparatus capable of performing communication with a server having a function for identifying a node infected with malware, the monitoring apparatus comprising:

a processor comprising:

a first detecting unit capable of detecting a plurality of nodes that have sent connection request information commonly to one of first destinations among a set of monitoring target nodes, the first detecting unit detecting, among the set of monitoring target nodes, a plurality of nodes that have not sent disconnection request information to the one first destination, the first detecting unit excluding as an infected node, nodes that have sent disconnection request information to the one first destination;

a second detecting unit capable of detecting, for each node in the set of monitoring target nodes, the number of second destinations to which the node has sent connection request information; and a sending unit sending, to the server, information regarding the plurality of nodes detected by the first detecting unit and information regarding the number of second destinations detected by the second detecting unit.

6. A non-transitory computer-readable recording medium having recorded thereon a program of a malware detecting method, the program being executed by a computer, the malware detecting method comprising:

detecting a plurality of nodes that have sent connection request information commonly to one of first destinations among a set of monitoring target nodes, the detecting a plurality of nodes including detecting, among the set of monitoring target nodes, a plurality of nodes that have not sent disconnection request information to the one first destination, and excluding as an infected node, nodes that have sent disconnection request information to the one first destination;

detecting, for each node in the set of monitoring target nodes, the number of second destinations to which the node has sent connection request information;

identifying a node infected with malware based on the plurality of nodes detected and the number of second destinations detected; and outputting a result of the identification.

7. A non transitory computer-readable recording medium having recorded thereon a program of a monitoring method, the program being executed by a computer capable of performing communication with a server having a function for identifying a node infected with malware, the monitoring method comprising:

detecting a plurality of nodes that have sent connection request information commonly to one of first destinations among a set of monitoring target nodes, the detecting a plurality of nodes including detecting, among the set of monitoring target nodes, a plurality of nodes that have not sent disconnection request information to the one first destination, and excluding as an infected node, nodes that have sent disconnection request information to the one first destination;

detecting, for each node in the set of monitoring target nodes, the number of second destinations to which the node has sent connection request information; and sending, to the server, information regarding the plurality of nodes detected and information regarding the number of second destinations detected.

8. A malware detecting method comprising:

detecting a plurality of nodes that have sent connection request information commonly to one of first destinations among a set of monitoring target nodes, the detecting a plurality of nodes including detecting, among the set of monitoring target nodes, a plurality of nodes that have not sent disconnection request information to the one first destination, and excluding as an infected node, nodes that have sent disconnection request information to the one first destination;

detecting, for each node in the set of monitoring target nodes, the number of second destinations to which the node has sent connection request information;

number of second destinations detected; and outputting a result of the identification.

9. A monitoring method for monitoring a set of monitoring target nodes by a monitoring apparatus capable of performing communication with a server having a function for identifying a node infected with malware, the monitoring method comprising:

detecting a plurality of nodes that have sent connection request information commonly to one of first destinations among a set of monitoring target nodes, the detecting a plurality of nodes including detecting, among the set of monitoring target nodes, a plurality of nodes that have not sent disconnection request information to the one first destination, and excluding as an infected node, nodes that have sent disconnection request information to the one first destination;

detecting, for each node in the set of monitoring target nodes, the number of second destinations to which the node has sent connection request information; and sending, to the server, information regarding the plurality of nodes detected and information regarding the number of second destinations detected.

* * * * *

UNITED STATES PATENT AND TRADEMARK OFFICE

CERTIFICATE OF CORRECTION

PATENT NO. : 8,375,445 B2
APPLICATION NO. : 12/258915
DATED : February 12, 2013
INVENTOR(S) : Yoshiki Higashikado It is certified that error appears in the above-identified patent and that said Letters Patent is hereby corrected as shown below:

In the Claims:

Column 16, Line 1, In Claim 7, delete “sent” and insert -- set --, therefor.

Signed and Sealed this
Fourteenth Day of May, 2013

Teresa Stanek Rea
*Acting Director of the United States Patent and Trademark Office*